United States Patent

[11] 3,563,479

| [72] | Inventors | Charles W. Brouwer<br>East Greenwich;<br>Raymond V. Tata, Warwick, R.I. |
|---|---|---|
| [21] | Appl. No. | 736,354 |
| [22] | Filed | June 12, 1968 |
| [45] | Patented | Feb. 16, 1971 |
| [73] | Assignee | Leesona Corporation<br>Warwick, R.I.<br>a corporation of Massachusetts<br>Continuation-in-part of application Ser. No.<br>666,625, Sept. 11, 1967, now abandoned. |

[54] BOBBIN HANDLING SYSTEM
9 Claims, 10 Drawing Figs.

[52] U.S. Cl. .................................................... 242/35.5;
198/38; 214/16, 214/60
[51] Int. Cl. ................................................. B65h 54/02
[50] Field of Search ........................................ 214/17,
16B; 198/20, 38, 39; 242/35.5

[56] References Cited
UNITED STATES PATENTS

| 1,729,600 | 9/1929 | Surdam | 198/38 |
|---|---|---|---|
| 1,970,188 | 8/1934 | Reiner et al. | 242/35.5 |
| 2,012,397 | 8/1935 | Mattler | 198/38 |
| 2,600,038 | 6/1952 | Whaley | 214/11X |
| 2,733,014 | 1/1956 | Hallman | 242/35.5(A) |
| 2,803,333 | 8/1957 | Freeman | 198/38 |
| 2,886,940 | 5/1959 | Urano et al. | 242/35.5(A) |
| 2,941,738 | 6/1960 | Burke et al. | 242/55.12 |
| 3,177,814 | 4/1965 | Bishop | 198/38X |
| 3,297,379 | 1/1967 | Artaud et al. | 312/223 |
| 3,318,435 | 5/1967 | Scott | 198/38 |
| 3,195,298 | 7/1965 | Furst | 57/1 |

FOREIGN PATENTS

| 563,594 | 3/1930 | Germany | 242/35.5 |
|---|---|---|---|
| 1,104,410 | 4/1961 | Germany | 242/35.5(A) |

*Primary Examiner*—Gerald M. Forlenza
*Assistant Examiner*—R. Johnson
*Attorneys*—Albert P. Davis and Burnett W. Norton ABSTRACT: A system for automatically handling bobbins during processing of the bobbins. Various types of bobbins to be processed are stored in a supply area such as a spinning room where each type is separated into units of predetermined quantity. The units are automatically delivered by means of loading hoppers to suspended containers of a conveyor system for transport to bobbin processing apparatus. Following processing, the bobbins pass to another hopper and are returned to the containers and removed from the processing area to the supply area for additional processing such as stripping off residual yarn, sorting and refilling with yarn. A control system operates the handling system by discriminating between the conveyor containers each of which is designated for handling but one type of bobbin, and determining the condition of each container, whether it is empty or carrying bobbins and if it is carrying bobbins whether the bobbins are processed or are to be processed, and whether or not the hoppers are prepared to deliver the bobbins and the processing apparatus ready to receive a unit of bobbins.

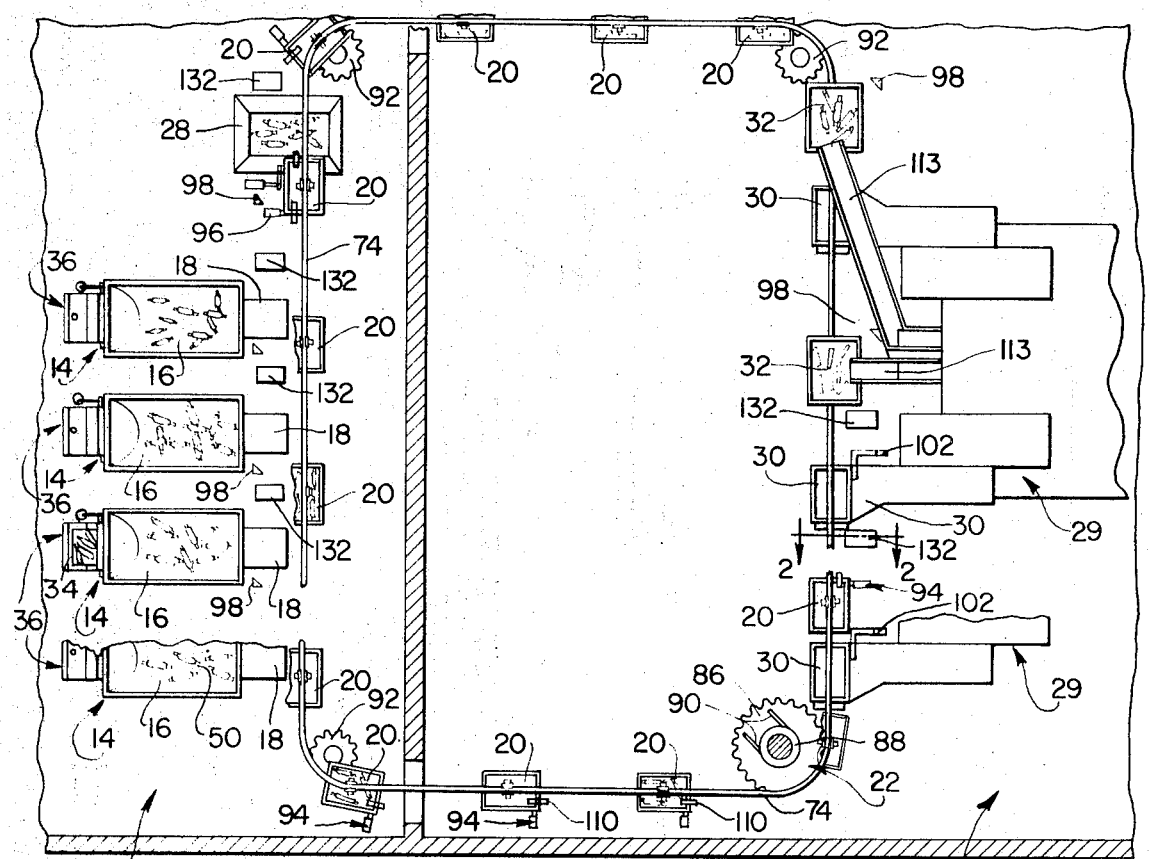
FIG. 1
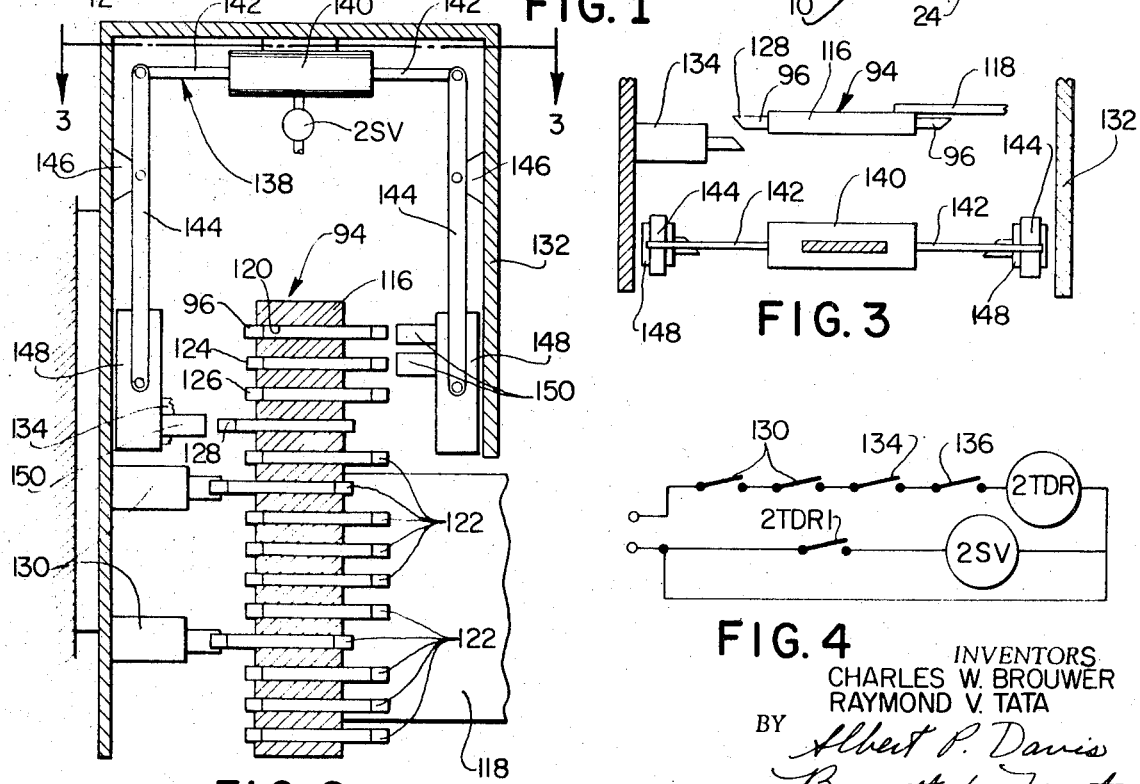
FIG. 2
FIG. 3
FIG. 4
INVENTORS
CHARLES W. BROUWER
RAYMOND V. TATA
BY
Albert P. Davis
Burnett W. Norton
ATTORNEYS

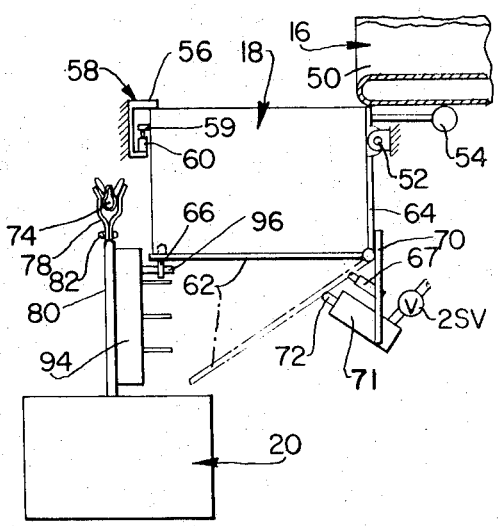
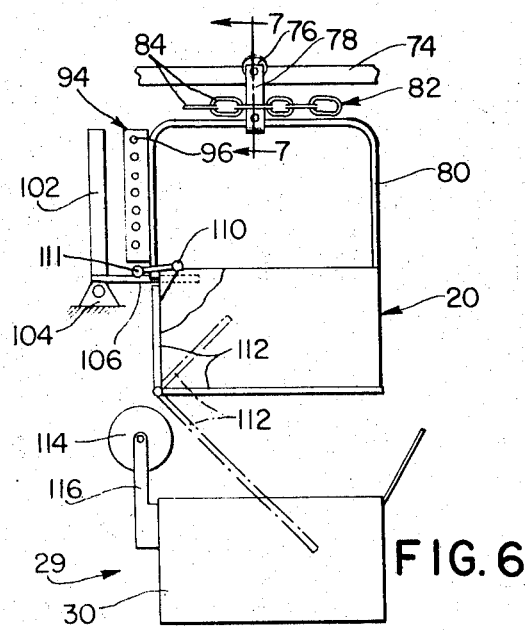
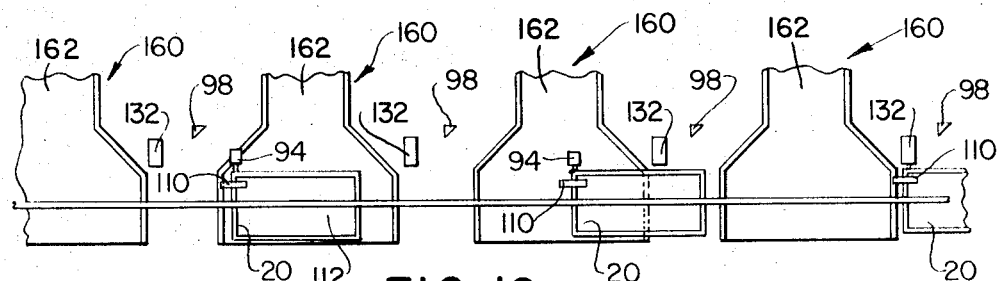
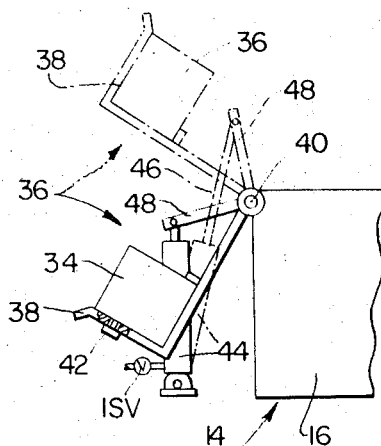
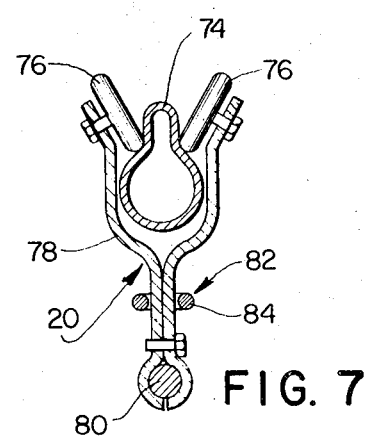
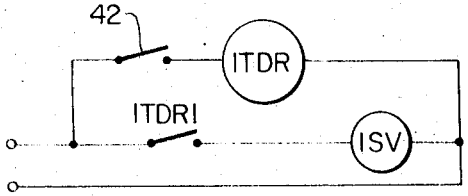

BOBBIN HANDLING SYSTEM

This application is a continuation-in-part of our copending application for a "Bobbin Handling Installation," U.S. Ser. No. 666,625, filed Sept. 11, 1967, now U. S. Pat. No. 3,474,975 granted Oct. 28, 1969.

This invention relates to an automatic system for handling bobbins and, more particularly, for handling the bobbins during processing thereof.

As used herein the term "bobbin" means any core or other member on which yarn is wound so that it may be moved from place to place, and to such a core or other member having yarn wound thereon. The term "filled bobbin" means a bobbin having a substantial winding of yarn thereon whether full or partially full and in condition for processing, as on a winder. The term "empty bobbin" means a bobbin which has been processed and is generally devoid of all but a very small quantity of residual yarn which will be discarded, or to any bobbin in which the yarn is to be discarded rather than processed. Terms such as "various types" or "different types" of bobbins means bobbins having different cores, or different yarn, or both different cores and yarns. The term "yarn" means all kinds of strand material, either textile or otherwise.

It has been common practice to store various types of filled bobbins, as they are doffed from spinning machines, in boxes in the spinning room. These boxes of bobbins are then moved to a winding room where they are generally transferred into a cart which is moved about the winding machine by an attendant who orients and inserts the individual bobbins at the winding stations of the machine. Often a single winding machine is simultaneously used for winding various types of yarn at its station so that the attendant must also select the correct type of bobbin for loading into each station. The labor cost of such an operation is considerable because of the number of attendants required, and there is a considerable chance of mistakes in selecting the correct type of bobbin and orienting the bobbin properly, as well as likelihood of scuffing the yarn during handling of the bobbins.

Various attempts at automatically handling yarn bobbins have had little, if any, commercial success. Various proposed machines for orienting filled bobbins and delivering the oriented bobbins to winding stations generally result in rough handling of the bobbins and require some preorientation, such as cording of the bobbins. Nor have attempts at automatically conveying filled bobbins from the spinning room to the winding room receive general commercial acceptance. These difficulties are more fully discussed in the previously noted a copending Leesona Corp. Pat. application for a "Bobbin Handling Installation," Ser. No. 666,625, filed Sept. 11, 1967, in which various types of filled bobbins are doffed from spinning frames in the spinning room of a textile mill and are deposited in storage conveyors from which they are conveyed on moving belts out of the spinning room and into a winding room. In the winding room the belt conveyor system delivers the bobbins to orienting mechanism which readies the bobbins and distributes the various types of bobbins to winding machines.

The invention is, in brief, directed to an automatic system for handling bobbins. Bobbins to be processed are stored in a storage area of the spinning room where they are segregated into units of predetermined quantities. Suspended containers of a conveyor each receives a unit of bobbins and transport their units to bobbin utilization or process apparatus such as a Uniconer* automatic winder manufactured by Leesona Corp. Warwick, Rhode Island, or to yarn dying or conditioning equipment. After processing, the bobbins are returned to the containers and conveyed away from the bobbin utilization apparatus, and generally are returned to the spinning room for subsequent processing. A control system identifies the type of bobbins in each container and indicates whether the container is empty of bobbins or contains bobbins and in the latter event whether the bobbins are full or empty. The control system operates loading hoppers at the storage area and return hoppers at the processing apparatus and operates the containers to discharge bobbins into receiving hoppers at the processing apparatus as well as the storage area.

It is a primary object of this invention to provide a new and improved system for automatically handling bobbins.

Another object is provision of a new and improved system for simultaneously handling various types of bobbins while maintaining the various types segregated.

A more specific object is provision of an automatic system for handling bobbins in which storage apparatus are operable at a supply area for discharging units of predetermined quantities of the bobbins, with a conveyor system having containers each for receiving a unit of bobbins from the storage apparatus and delivering the unit to bobbin utilization or processing apparatus from which processed bobbins are returned by the conveyor system to the supply area, and a control system for operating the conveyor system and apparatus to transfer the bobbins. A related object is provision of such a bobbin handling system in which processed bobbins are returned from the bobbin processing apparatus, preferably back to the storage area, for subsequent processing and reuse. Another related object is provision of such a bobbin handling system for simultaneously handling various types of bobbins to be processed and maintaining the various types separate from each other.

These and other objects and advantages of the invention will be apparent from the following description and the accompany drawing, in which:

FIG. 1 is a fragmentary, foreshortened schematic plan view of a portion of a textile mill including a spinning room and a winding room, and a conveyor system for transporting bobbins between apparatus in these rooms, with parts broken away and removed for clearer illustration;

FIG. 2 is an enlarged, fragmentary, schematic sectional view of a portion of a control system, taken generally along the line 2–2 in FIG. 1, with parts broken away and removed for clearer illustration;

FIG. 3 is a sectional view taken generally along the line 3–3 in FIG. 2;

FIG. 4 is a wiring diagram of a portion of the control system;

FIG. 5 is an enlarged, fragmentary, schematic elevational view of a container of the conveyor system at a loading hopper, with parts broken away and removed for clearer illustration;

FIG. 6 is an enlarged, fragmentary, schematic elevational view of the conveyor container at a receiving hopper, with parts broken away for clearer illustration;

FIG. 7 is an enlarged sectional view taken generally along the line 7–7 in FIG. 6;

FIG. 8 is an enlarged, fragmentary, schematic elevational view of a doffing box unloading mechanism shown in FIG. 1;

FIG. 9 is a wiring diagram for operation of the unloading mechanism shown in FIG. 8; and FIG. 10 is an enlarged plan view of a modification of a portion of the system shown in FIG. 1.

With reference to FIG. 1 of the drawings, in a textile mill 10 a supply area such as a spinning room 12 contains a plurality of spinning frames (not shown) and loading stations 14 including storage-conveyor bins 16. A plurality of loading stations 14 are provided, one for handling each of a plurality of different types of bobbins and maintaining the different types of bobbins separated from each other. The bins 16 are of the general type described in the aforementioned copending patent application. Measuring and loading hoppers 18 of the stations 14 receive bobbins for processing from associated bins 16 and discharge the bobbins to suspended containers 20 of a conveying system 22. The bobbins are transported into a processing area such as a winding room 24 and, more particularly, to bobbin utilization or processing apparatus such as winding machines 29 of the type described in the aforementioned copending patent application, such as the Uniconer* automatic winder. Two winding machines 29 are shown in the drawings, and each of these machines is shown as having two bobbin receiving hoppers 30, each station for handling a different one of the types of bobbins. At the winding machines 29 the bobbins are processed, that is emptied. After emptying the bobbins during processing, they are returned to a processed or empty bobbin hopper 32 from which the bobbins pass to a conveyor container 20 and are deposited in a receiving station hopper 28 in the spinning room. From this hopper the bobbins may be further processed for reuse in the spinning operation and thereafter returned to the storage-conveyor bins 16.

As a spinning frame is doffed, the doffer (attendant) tosses the filled bobbins in doffing boxes 34 which are then moved to a box handling mechanisms 36, one at the rear end of each of the bins 16. With reference to FIG. 8, the box handling mechanism 36 includes a generally L-shaped elevator 38 fixed at its upper end to a horizontal shaft 40 journaled on the bin 16. As the box 34 is placed on the elevator 38 it depresses a switch 42 which is in circuit (FIG. 9) with a terminally timed and initial time delay relay 1TDR. When the initial delay period of the relay is over, its contact 1TDR1 closes, thus energizing a self-venting solenoid valve 1SV to an actuating cylinder 44 causing the cylinder's piston rod 46 to extend and through a link 48 pivoted to the free end of the piston rod and fixedly secured to the shaft 40, the elevator 38 is swung upwardly from its normal solid line position to the phantom line position as shown in FIG. 8, thus dumping the filled bobbins into the associated bin 16. At the end of the terminal time of the relay its contact 1TDR1 opens, thus deenergizing the solenoid valve 1SV and permitting the cylinder 44 to vent through the valve as the elevator 38 lowers to its normal position.

As shown in FIGS. 1 and 5, each different type of bobbin has its own bin 16 which comprises a continuous sagging conveyor belt 50 operated intermediately by a drive motor (not shown, see previously-mentioned patent application) to move the bobbins from the rear end of the bin 16 to the front end where they drop into the loading hopper 18 which measures a predetermined quantity of the bobbins. The hopper 18 is pivoted adjacent its upper end by means of a shaft 52 journaled on the bin 16 for swinging movement about a horizontal axis, with the hopper counterweighted (as at 54) to urge it upwardly against a stop 56 on a fixed bracket 58. When the desired weight of bobbins has been deposited in the hopper 18 the combined weight of the hopper and the bobbins causes a tab 59 on the hopper 18 to depress a switch 60 mounted on the bracket 58 and connected in suitable circuit with the drive motor for stopping operation of the conveyor belt 50. A bottom wall 62 of the hopper 18 is pivoted to the lower edge of a sidewall 64 of the hopper adjacent the storage bin 16, and is retained in closed position by a latch 66 suitably spring pressed to latching position and unlatched by pivotal movement in a direction away from the viewer as seen in FIG. 5, to permit the bottom wall 62 to pivot downwardly for discharge of the bobbins from the hopper. When the bottom wall of the loading hopper drops it engages and closes a switch 67 secured to a bracket 70 depending from the hopper, thus energizing a circuit similar to that shown in FIG. 9 to energize an initial delay time delay relay (not shown) which, when the initial delay period has expired, causes its normally open contact to close thus energizing and opening a self-venting solenoid valve 2SV (FIG. 45) which then passes compressed fluid to a cylinder 71 causing the cylinder's piston rod 72 to extend and swing the bottom wall 62 of the hopper closed and latched.

The conveyor system includes a track 74 of the configuration shown in FIG. 7. This track receives pairs of inclined wheels 76 journaled at upper ends of a Y-shaped mounting bracket 78 which at its lower end carries a bail 80 (see also FIGS. 5 and 6) secured to front and rear walls of the container 20.

A plurality of the containers 20 are provided on the track 74 with their mounting brackets 78 connected by a conveyor drive chain 82 (FIGS. 5—7), equally spaced links 84 of the chain embracing the shanks of the Y-shaped mounting brackets 78. A suitable drive motor (not shown) drives the conveyor chain through a driven sprocket 86 (FIG. 1) mated with the chain 82 and driven by a pulley 88 receiving a drive belt 90 from the motor. At corners of the conveyor track 74, idler sprockets 92 are provided to guide the chain around the corners. The containers 20 travel at slow rate along the track 74 and when a container designated to receive a particular type bobbin is empty of bobbins and approaches the loading hopper 18 containing a unit of that type of bobbins, a control system index assembly 94, to be described in detail later, has an operator rod 96 on the container 20 projected into an operative position to engage the latch 66 on the hopper 18 to pivot the latch and release the bottom wall 62 of the hopper so that the bobbins drop into the container 20. As the container continues to move along the track 74, the operator rod 96 engages an inclined cam 98 (FIG. 1) which causes the rod 96 to be cammed to its inoperative position.

The container 20 of bobbins to be processed continues to travel along the track 74 until it comes to a receiving hopper 30 (FIGS. 1 and 6) of a winding machine 29 for receiving the particular type of bobbins to be processed. If this winding station requires bobbins, the control system again causes the operator rod 96 on the container to be projected into the path of an upwardly extending lever 102 pivoted to a fixed support 104 at its lower end for movement about a horizontal axis, and having integral therewith a foot 106. As the lever 102 is pivoted by the operator rod 96, the foot 106 lifts a latch 110 pivoted, about a horizontal axis 111, to a sidewall of the container, thus releasing a container bottom and front walls 112 which are journaled on the sidewalls so that they may pivot downwardly (to the phantom line position) thus discharging the bobbins into the receiving hopper 30 of the winding machine. As the container 20 continues to move along the track 74 its bottom and front walls 112 are pivoted upwardly through engagement with a roller 114 pivoted on brackets 116 extending upwardly from the hopper 30 to swing the bottom and front walls upwardly and back into engagement with the latch 110 which is spring pressed into latching position.

The container 20 which has just delivered bobbins to the receiving hopper 30 of the winding machine 29 moves but a short distance with its operator rod 96 extended and this rod now opens the associated empty bobbin hopper 32 which receives processed or empty bobbins which were previously deposited in the associated receiving hopper 30. These empty bobbins are conveyed to the empty bobbin hopper 32 in any suitable manner, for example by a conveying mechanism 113 including an elevating conveyor which receives the bobbins from the empty bobbin conveyor of the previously-mentioned winding machine. The empty bobbin hopper 32 is fixed and may be of the same general type as the loading hopper 18 shown in FIG. 5 (less the pivotal mounting of the hopper 18 and the associated counterweight and weight-responsive bobbin metering switch.) Thus, as the container operator rod 96 engages a latch of this hopper, the hopper bottom wall swings down permitting the empty bobbins to pass into the container 20. Thereupon, a closing system similar to that described with reference to the loading hopper 18 functions to close the bottom wall of the empty bobbin hopper 32.

Continued movement of the container 20 along its track 74 brings the container to the processed or empty bobbin receiving station hopper 28 in the spinning room, whereupon the control system again causes the operator rod 96 to be projected to its operative position for engagement with an unlatching mechanism as shown and described with reference to FIG. 6. Thus, the empty bobbins drop from the container 20 into the hopper 28 for subsequent processing such as stripping of residual yarn from the bobbins before again donning the bobbins on the spinning frame. Thus, the container 20 is again empty and ready to receive additional bobbins from its associated loading hopper 18.

The control system is schematically illustrated in FIGS. 1-—4. The index assembly 94 includes a vertical lock 116 is secured by means of a plate 118 to the right front edge of each container 20. In the illustrated embodiment this block 116 carries 14 rods which include the previously-mentioned operating rod 96. Each of these rods is snugly telescopically received in a passage, as 120, extending through the block 116 and transversely of the track 74. With reference to FIG. 2, in operating position the rods extend well outwardly from the left edge of the block and in inactive position the rods are telescoped inwardly relative to the left edge of the block. The lowermost 10 rods are container identification rods 122. These rods 122 are numbered from one through zero starting with the top of the 10 lowermost rods, so that 45 different combinations of two digit numbers may be obtained, each indicating a different type of bobbin. As shown in FIG. 2, the identification number is 27. Additionally, the top rod shown in FIG. 2 is the operator rod 96, the second from the top rod 124 indicates that bobbins to be processed are carried by the particular container while the third rod 126 from the top indicates that processed bobbins are in the particular container and the fourth rod 128 from the top indicates an empty container.

As an empty container 20 approaches its associated loading hopper 18, its identification rod 122 contacts associated switches 130 on a control station housing 132 and its empty container rod 128 (which is telescoped to the left, FIG. 2) engages another switch 134 at the control station housing 132 so that these three switches are closed. Now, if the loading hopper 18 contains the predetermined quantity of bobbins to be processed, a second weight responsive switch 136 (similar to the switch which operates the storage bin conveyor belt motor) is connected in the circuit shown in FIG. 4 and will be closed, thus energizing a terminal delay time delay relay 2TDR to close its contact 2TDR1 and thereby energize a self-venting solenoid valve 2SV which operates a positioning mechanism 138 downstream from the switches and mounted on the same housing 132 as the switches. When the solenoid valve 2SV opens, it admits air to a cylinder 140 having independent, opposed pistons with rods 142 extending from opposite ends of the cylinder. These piston rods 142 are pivoted to the upper ends of levers 144, the levers in turn pivoted intermediate their ends to brackets 146 extending from sidewalls of the housing 132 to cause blocks 148 pivoted at lower ends of these levers 144 to be swung inwardly. These blocks 148 carry fixed abutment lugs 150 for engaging appropriate control rods including a lug for engaging the right end (FIG. 2) of the operator rod 96 to move the operator rod to its active position and similarly a lower abutment lug for engaging the full bobbin rod 124. The block 148 on the left-hand lever 144 carries an abutment lug 150 for retracting the empty container rod 128. Thus, as the index assembly 94 leaves the resetting mechanism, the operator rod 96 and full bobbin rod 124 are in operative or active position and the empty container rod 128 has been retracted into inactive position. It should be noted that the container identification rods 122 are not changed during operation of the control system and are only changed as required by changing of types of bobbins, and the like.

With the operator rod 96 extended, it will engage the latch 66 of the loading hopper 18 (FIG. 5), causing the bottom wall 62 of the hopper to drop and deliver the unit of full bobbins to the container 20. As the container 20 continues to move, the operator rod 96 engages the cam 98 and is moved to its inactive position.

When the container 20 now comes to the associated receiving hopper 30 of the winding machine, its full bobbin rod 126 is in active position and if the receiving hopper requires bobbins a suitable switch (such as a weight responsive switch of the orienting barrel disclosed in the aforementioned copending patent application) is closed so that all switches (such as shown in FIG. 4) would be closed and the associated control station positioning apparatus 138 functions to again extend the operator rod 96 for engaging the lever 102 (FIG. 5) and operating the latch 110 on the container 20 to cause its end and bottom wall 112 to pivot downwardly, discharging the bobbins to be processed into the receiving hopper 30 of the winding machine. The positioning apparatus 138 further extends the empty bobbin rod 126 and retracts the full bobbin rod 124. As the container 20 leaves the receiving hopper 30 its operator rod 96 remains in active position to engage the latch (of the type shown in FIG. 5) and open the processed or empty bobbin hopper 32 and permit the empty bobbins to be delivered to the container. The operator rod 96 engages a cam 98 and is moved to its inactive position and the container 20 continues to move to the empty bobbin receiving station 28 at which station the appropriate switches are closed by the rods to cause the positioning apparatus 138 (not shown) at this station to retract the empty bobbin rod 126 and extend the empty container rod 128 and the operator rod 96. Thereafter, the operator rod 96 engages a discharge lever (as 102 in FIG. 6) to again cause the end and bottom wall 112 of the container 20 to pivot downwardly and discharge the empty bobbins into the empty bobbin hopper 28. The operator rod 96 now engages a cam 98 and is moved to inactive position.

FIG. 10 shows a modification of the empty bobbin return station wherein, in lieu of the hopper 28, a plurality of yarn stripping machines 160 are provided. These machines may be Timmer automatic bobbin stripping machines, manufactured by Josef Timmer Maschinenfabrick and distributed by Holt Associates, Inc. Greensboro, N.C., U.S.A. These strippers provide a convenient manner for maintaining different types of bobbin cores separated. Each different type of core will arrive at the station in a container 20 carrying identification for that type of bobbin core and each of the stripper stations have a positioning station 132 which operates in the previously described manner to empty only containers having empty cores of the appropriate type into a hopper 162 of the associated stripper.

While this invention has been described with reference to particular embodiments in a particular environment, various changes may be apparent to one skilled in the art and the invention is therefore not to be limited to such embodiments or environment except as set forth in the appended claims.

We claim:

1. A bobbin handling system comprising a first bobbin handling area, a second bobbin handling area, bobbin carrying means, first bobbin delivery means in said first bobbin handling area for delivery of filled bobbins to said bobbin carrying means, first bobbin receiving means in said first bobbin handling area for receiving empty bobbins from said bobbin carrying means, second bobbin receiving means in said second bobbin handling area for receiving said filled bobbins from said bobbin carrying means, means in said second bobbin handling area for receiving the filled bobbins from the second bobbin receiving means and unwinding the filled bobbins to substantially empty the bobbins, second bobbin delivery means in said second bobbin handling area for receiving the empty bobbins from the unwinding means and delivering the empty bobbins to said bobbin carrying means, said bobbin carrying means comprising means for conveying the filled and empty bobbins back and forth between the first and second bobbin handling areas and including a plurality of common bobbin carriers for carrying the filled and empty bobbins, and control means comprising indicating means and responsive means, said indicating means indicating whether each said bobbin carrier is in condition to receive filled bobbins from said first area or empty bobbins from said second area, or to deliver filled bobbins to said second area or empty bobbins to said first area, and said responsive means being responsive to the indicating means for controlling interaction of each said bobbin carrier with an appropriate one of the first or second bobbin delivery means or first or second bobbin receiving means, to deliver or receive filled or empty bobbins.

2. A system as set forth in claim 1 in which said indicating means indicates the condition of the bobbin carriers by providing a first bobbin carrier condition signal indicating when a bobbin carrier is empty of bobbins, a second bobbin carrier condition signal indicating when a bobbin carrier is carrying filled bobbins, and a third bobbin carrier condition signal indicating when a bobbin carrier is carrying empty bobbins.

3. A system as set forth in claim 1 in which the first bobbin delivery means includes a plurality of delivery stations, at least one for each of a plurality of types of filled bobbins, for discharging the filled bobbins delivered thereby, one of said bobbin carriers being provided for each of said delivery stations for receiving the filled bobbins therefrom, and said second bobbin receiving means includes a plurality of bobbin receiving stations, one for each of said types of filled bobbins, for receiving the bobbins from the bobbin carrier carrying the type of filled bobbins handled by the particular bobbin receiving station.

4. A system as set forth in claim 3 in which said control means provides bobbin carrier identification signals indicating the type of bobbins handled by each of said bobbin carriers, and station identification signals indicating the type of bobbins handled by each of said stations.

5. A system as set forth in claim 3 in which said control means provides a bobbin carrier identification signals indicating the type of bobbins handled by each of said bobbin carriers, and station identification signals indicating the type of bobbins handled by each of said stations, and said indicating means indicates the condition of the bobbin carriers by providing a first bobbin carrier condition signal indicating when a bobbin carrier is empty of bobbins, a second bobbin carrier condition signal indicating when a bobbin carrier is carrying filled bobbins, and a third bobbin carrier condition signal indicating when a bobbin carrier is carrying empty bobbins.

6. A system as set forth in claim 5 in which said control means provides ready signals, one for each of said first bobbin delivery stations, indicating when the associated station is ready to deliver filled bobbins, and further provides other ready signals, one for each of said second bobbin receiving stations, indicating when the associated station is ready to receive bobbins.

7. A system as set forth in claim 6 in which said control means provides an operating signal for causing transfer of bobbins between one of said bobbin carriers and one of said stations when the respective bobbin carrier and station identification signals correspond, and the respective condition and ready signals indicate that the last said bobbin carrier and station are in condition for such transfer.

8. A system as set forth in claim 1 in which said first bobbin handling area includes supply means operable for supplying filled bobbins to the associated first bobbin delivery means, and actuating means responsive to said first bobbin delivery means having less than a predetermined quantity of bobbins, for operating the associated supply means to deliver filled bobbins to the first bobbin delivery means and to stop delivery of the bobbins when the first bobbin delivery means contains said predetermined quantity of bobbins.

9. A system as set forth in claim 8 in which said actuating means is responsive to the weight of the bobbins at the first bobbin delivery station for operating the associated supply means.